(12) United States Patent
Yang

(10) Patent No.: US 9,930,391 B1
(45) Date of Patent: Mar. 27, 2018

(54) NETWORK PERSONAL VIDEO RECORDER UTILIZING PERSONAL DIGITAL STORAGE

(71) Applicant: Harmonic, Inc., San Jose, CA (US)

(72) Inventor: Charlie Xiaolin Yang, Sunnyvale, CA (US)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 14/484,009

(22) Filed: Sep. 11, 2014

(51) Int. Cl.
| H04N 7/16 | (2011.01) |
| H04N 21/4147 | (2011.01) |
| H04N 21/432 | (2011.01) |
| H04N 21/258 | (2011.01) |
| H04N 21/4405 | (2011.01) |
| H04N 21/475 | (2011.01) |
| H04N 21/643 | (2011.01) |
| H04N 21/222 | (2011.01) |

(52) U.S. Cl.
CPC ..... *H04N 21/4147* (2013.01); *H04N 21/2221* (2013.01); *H04N 21/25816* (2013.01); *H04N 21/25875* (2013.01); *H04N 21/4325* (2013.01); *H04N 21/4405* (2013.01); *H04N 21/4753* (2013.01); *H04N 21/64322* (2013.01)

(58) Field of Classification Search
CPC combination set(s) only.
See application file for complete search history.

(56) References Cited

U.S. PATENT DOCUMENTS

| 2004/0268036 | A1 | 12/2004 | Sugihara | |
| 2005/0169467 | A1* | 8/2005 | Risan | G11B 20/00086 380/201 |
| 2008/0294901 | A1* | 11/2008 | Farrugia | G06F 21/10 713/176 |
| 2009/0010610 | A1* | 1/2009 | Scholl | G11B 27/105 386/314 |
| 2009/0049464 | A1 | 2/2009 | Kang | |
| 2010/0180312 | A1* | 7/2010 | Toya | H04L 12/2812 725/78 |
| 2010/0218223 | A1 | 8/2010 | Simpson et al. | |
| 2010/0319044 | A1 | 12/2010 | Agans | |
| 2011/0030018 | A1 | 2/2011 | Mizuno et al. | |
| 2011/0118858 | A1* | 5/2011 | Rottler | H04L 63/08 700/94 |
| 2013/0016955 | A1* | 1/2013 | Pejaver | 386/248 |

(Continued)

*Primary Examiner* — Alexander Gee
(74) *Attorney, Agent, or Firm* — Brokaw Patent Law PC; Christopher J. Brokaw

(57) ABSTRACT

Approaches for operating a network personal video recorder operated by a content provider. The network personal video recorder may be located at a head-end of a digital content provider. A network personal video recorder receives, from a user, authentication credentials that provide the network personal video recorder access, via the Internet, to a storage medium belonging to or associated with the user. After the user instructs the network personal video recorder to record a video program, the network personal video recorder stores a copy of the video program on the user's storage medium using the user-provided authentication credentials. Thereafter, when the user wishes to view the video program, the user can instruct the network personal video recorder to read the copy of the video program from the storage medium and play the video program on a device of the user.

12 Claims, 3 Drawing Sheets

(56) References Cited

U.S. PATENT DOCUMENTS

| | | | | |
|---|---|---|---|---|
| 2013/0282785 | A1* | 10/2013 | Besen | G06F 17/30174 709/201 |
| 2013/0347070 | A1* | 12/2013 | Cairns | H04L 63/126 726/3 |
| 2014/0075583 | A1* | 3/2014 | Martin | G06F 21/10 726/31 |
| 2014/0143358 | A1* | 5/2014 | Beausoleil | H04L 51/38 709/206 |
| 2014/0173230 | A1* | 6/2014 | Smith | H04L 67/1095 711/162 |
| 2014/0237520 | A1* | 8/2014 | Rothschild | H04N 21/236 725/88 |
| 2014/0325545 | A1* | 10/2014 | Willis | H04N 21/44204 725/14 |
| 2015/0074700 | A1* | 3/2015 | Danovitz | H04N 21/4826 725/14 |
| 2015/0120763 | A1* | 4/2015 | Grue | G06F 17/30386 707/754 |
| 2015/0193465 | A1* | 7/2015 | Schoeffler | G06F 17/30194 707/827 |

* cited by examiner

NETWORK PERSONAL VIDEO RECORDER UTILIZING PERSONAL DIGITAL STORAGE

FIELD OF THE INVENTION

Embodiments of the invention generally relate to a network-based digital video recorder, and more particularly, to approaches for storing digital video delivered by a network-based digital video recorder.

BACKGROUND

A network personal video recorder is a network-based digital video recorder. A digital content provider may provide to a plurality of authorized users access to a network personal video recorder for use as an individual video recording service. A user can use the network personal video recorder to record a video program, such as a television show episode, a movie, a sporting event, and the like. After being instructed by a user to record a video program, the network personal video recorder records the video program by recording and storing a copy of the video program at the digital content provider's location. The network personal video recorder delivers the copy of the video program to the user over a network (for example by streaming the video program over the Internet) at a later time when the user requests the viewing of the recorded video program.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
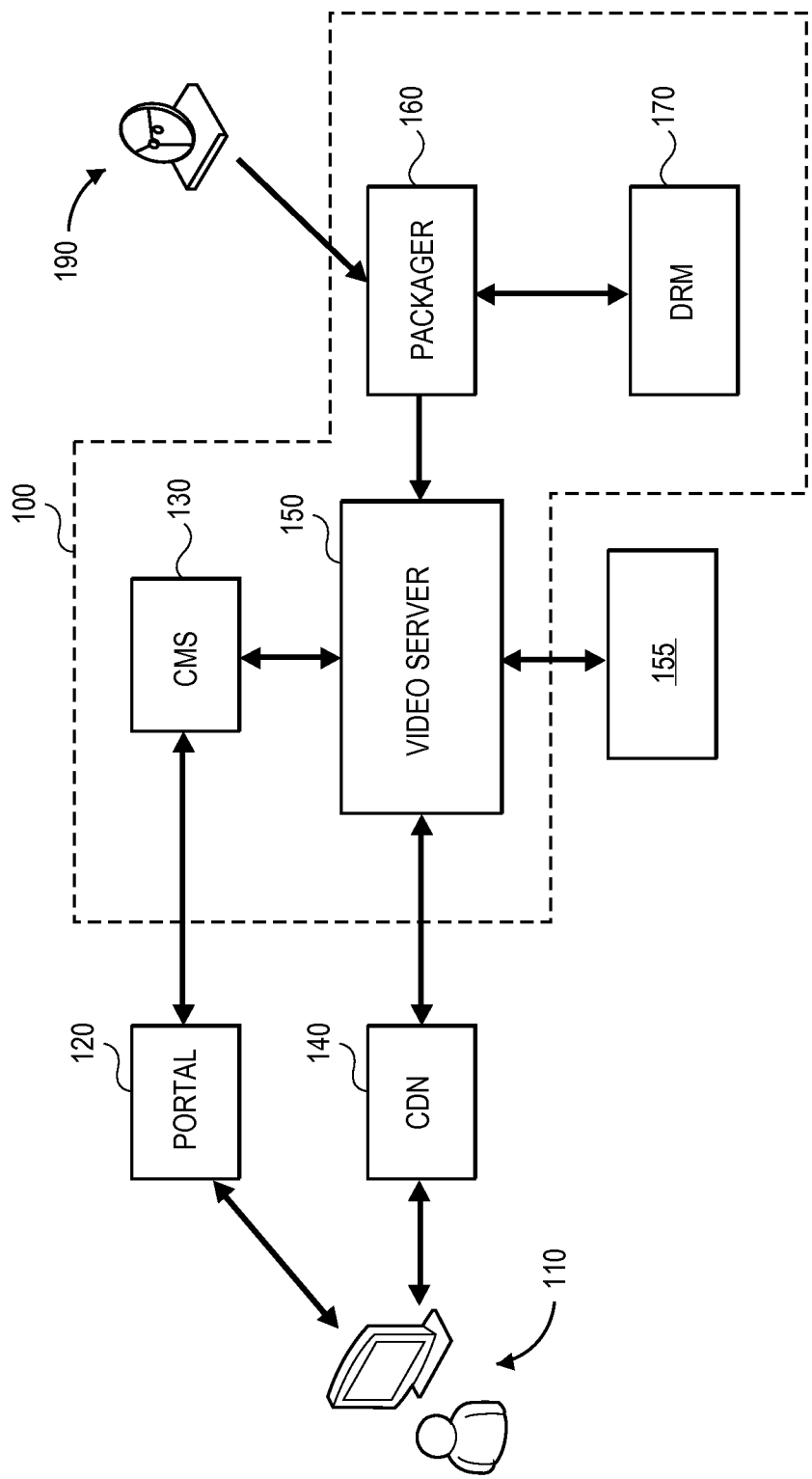
FIG. 1 is an block diagram of the functional components of one embodiment of the invention.

Approaches for operating a network personal video recorder are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

A large number of users may use a network personal video recorder provided by a single digital content provider. Different users of the same network personal video recorder may wish to record the same video program. To comply with national copyright and intellectual property laws across Europe and North America, when multiple users instruct the a network personal video recorder to record the same video program, the network personal video recorder records and stores a separate copy of the video program at the digital content provider's location for each user wishing to record the video program. Note that this obligation exists regardless of how many separate instances of a network personal video recorder are operated by the digital content provider. Storing a large number of copies of the same video program not only requires the expenditure of a significant amount of storage and processing power by the digital content provider, but also burdens the caching capability of the network personal video recorder.

Advantageously, embodiments of the invention minimize the storage requirements of the digital content provider to operate a network personal video recorder. As such, network personal video recorders of an embodiment may scale to support many more users than prior approaches. Moreover, network personal video recorders of an embodiment may be operated with greater efficiency and less cost due to the substantial reduction in digital storage requirements during operation.

Various vendors offer cloud-based digital storage to users for free or for a nominal charge. For example, services such as Google Drive available from Google, Inc. of Mountain View, Calif., Dropbox available from Dropbox, Inc. of San Francisco, Calif., and Microsoft OneDrive available from Microsoft, Inc. of Redmond, Wash. allow users to create an account and store large amount of digital data on a network-accessible storage system using authentication credentials associated with their account. Hereafter, such vendors shall be referred to as cloud-based storage providers.

According to an embodiment, a user may register with a cloud-based storage provider to obtain an amount of digital storage accessible over the Internet. The user may then provide the authentication credentials associated with that account to a network personal video recorder. Once the network personal video recorder receives the authentication credentials, the network personal video recorder may use the authentication credentials to authenticate itself to gain read and write access to the cloud-based digital storage associated with the user's account. When the user instructs the network personal video recorder to record a video program, the network personal video recorder can store a copy of the video program on the user's cloud-based digital storage space using the user-provided authentication credentials. Thereafter, when the user wishes to view the video program, the user can instruct the network personal video recorder to read the copy of the video program from the cloud-based digital storage space and play the video program on a particular device of the user.

To better appreciate additional details and embodiments of the invention, a discussion of the architecture layout of an illustrative system is now presented.

Architecture Overview

FIG. 1 is a block diagram illustrating a network personal video recorder 100 according to an embodiment of the invention. In addition to network personal video recorder 100, FIG. 1 also depicts receiver 190, portal 120, content delivery network (CDN) 140, and device 110. Receiver 190 is intended to broadly represent any component capable of receiving signals of video programs and providing those signals to network personal video recorder 100. Non-limiting, illustrative examples of receiver 190 include an antenna and a satellite dish. While only a single receiver 190 is depicted in FIG. 1 for clarity, in practice any number of individual receivers may be employed.

Network personal video recorder 100 may include packager 160, digital rights management (DRM) module 170, video server 150, and content management system (CMS) 130. Each of these components will be described in turn.

Packager 160 receives signals of video programs from receiver 190. Packager 160 encodes and or segments the received signals of video programs based on one or more adaptive bitrate streaming protocols and provides encoded copies of the received video programs to video server 150. Non-limiting, illustrative examples of adaptive bitrate streaming protocols which may be used by packager 160 to encode the received video programs include APPLE hypertext transfer protocol (HTTP) Live Streaming (APPLE HLS), MICROSOFT Smooth Streaming, ADOBE HTTP Dynamic Streaming (ADOBE HDS), and Moving Picture Experts Group (MPEP) Dynamic Adaptive Streaming over HTTP (MPEP-DASH). Packager 160 may be implemented by one or more software programs running on one or more computer systems. An example of packager 160 is ProMedia Live/Package available from Harmonic, Inc. headquartered in San Jose, Calif.

Packager 160 operates in tandem with DRM module 170 to include digital right management information in the encoded copies of the received video programs produced by packager 160. DRM module 170 may be implemented by one or more software programs running on one or more computer systems. While packager 160 and DRM module 170 are depicted as separate entities in FIG. 1, in other embodiments of the invention packager 160 and DRM module 170 may be implemented by the same entity or on the same computer system.

In one embodiment (not depicted in FIG. 1), video server 150 receives copies of video programs from video content providers such as movie studios, television program production companies, or sports leagues via network (e.g., via the Internet or a dedicated network) or via removable storage media (e.g., removable hard disk drive or tape). In an alternate embodiment (depicted in FIG. 1), video server 150 receives copies of video programs from packager 160 which were encoded by packager 160. Video server 150 may be implemented by one or more software programs running on one or more computer systems. For example, video server 150 may be embodied by the ProMedia Origin software products available from Harmonic, Inc. headquartered in San Jose, Calif.

Video server 150 may store copies of video programs in user data storage 155. User data storage 155 may correspond to one or more cloud-based digital data storage systems that are offered by a cloud-based storage provider. To illustrate certain non-limiting examples, user data storage 155 may be embodied by Google Drive available from Google, Inc. of Mountain View, Calif., Dropbox available from Dropbox, Inc. of San Francisco, Calif., and Microsoft OneDrive available from Microsoft, Inc. of Redmond, Wash. Alternatively, user data storage 155 may be embodied by a personal digital storage device of which the user has physical custody. For example, user data storage 155 may be implemented by a hard-disk drive, a flash drive, and the like. However, if the user has physical custody of the personal digital storage device acting as user data storage 155, the personal digital storage device needs to be accessible over a network in a manner which can be authenticated using authentication credentials.

During operation, video server 150 delivers, or streams, a copy of a video program, originally stored in user data storage 155 to user device 110 over one or more networks (e.g., a wide area network, a cellular network, a wireless local area network, a portion of the Internet, and so on). The copy of the video program may also be delivered to user device 110 via content delivery network (CDN) 140, which is a private or restricted network for delivering a type of content.

User device 110, as used herein, broadly represents any type of device capable of displaying a video to a user. For example, user device 110 may correspond to a computer system, a personal computer, a smart phone, an in-car computer system, a tablet PC, a personal digital assistance (PDA), a smart watch, and the like. Note that it is contemplated by the inventors that a user may have a variety of different user devices 110; as such, the user device 110 used by a user in interacting with network personal video recorder 100 in a first occasion may be different than the user device 110 used by the same user to interact with the network personal video recorder 100 in another occasion.

Content management system (CMS) 130 manages access to copies of video programs stored in the user data storage 155 by users of the network personal video recorder service. CMS 130 manages, among other things, user access verification, provisioning, monitoring, reporting, and billing for the service (whereby the service is access to network personal digital recorder 100).

In one embodiment, receiver 190, packager 160, DRM module 170, video server 150, and CMS 130 are installed in a head-end of a cable television operator, telecommunication network operator, direct-to-home (DTH) television operator, broadcast television operator, or over-the-top (OTT) content provider.

In an embodiment, portal 120 is responsible for an electronic program guide that presents to users of network personal video recorder 100 a listing of available video programs. The listing of available video programs may include video programs from content distributers such as television (TV) stations, cable TV operators, and satellite TV operators. Portal 120 may be implemented by one or more software programs executing on one or more computer systems. Note that users may use different user devices to access portal 120 and to view video programs. For example, a user may wish to record a video program by interacting with portal 120 using their cell phone, and thereafter may wish to watch the video program using the tablet PC. In an embodiment, a user may interact with portal 120 using a web-based interface, such as a web page.

A user of network personal video recorder 100 is identified by a unique user identifier. Note that a user identified by a particular user identifier need not in all embodiments be the same individual or entity. For example, a user can be any member of a family that uses the same user identifier to access services provided by network personal video recorder 100.

Registering a Digital Storage Medium

Figure 2:
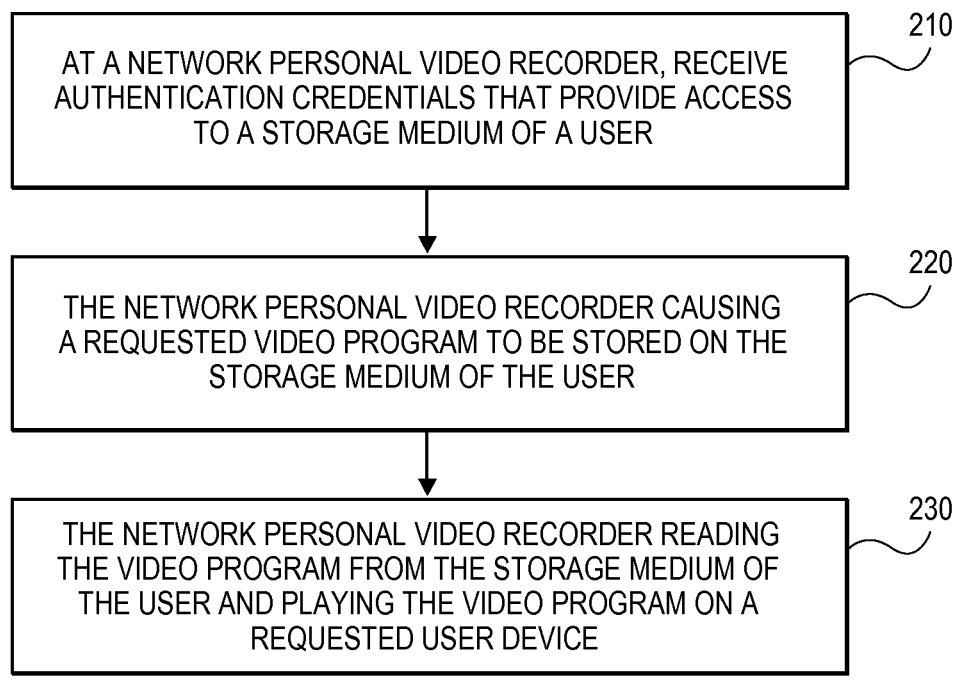
FIG. 2 is a flowchart illustrating the steps of operating a network personal video recorder according to an embodiment of the invention.

FIG. 2 is a flowchart illustrating the steps of operating a network personal video recorder according to an embodiment of the invention. However, before network personal video recorder 100 can use a digital storage medium in the possession or control of the user, the user must register the digital storage medium with network personal video recorder 100. Doing so provides network personal video recorder 100 with the authorization and ability to use the registered digital storage medium to store video program(s) which the user desires to record.

Accordingly, in step 210 of FIG. 2, a user registers a digital storage medium belonging to, in the control of, or associated with that user with network personal video recorder 100. One way in which is user may do so is for the user to use user device 110 to communicate with portal 120. Portal 120 may provide a user interface through which the user may register a digital storage medium. In the process of registering a digital storage medium with portal 120, the user must provide authentication credentials which will be used by network personal video recorder 100 to access the digital storage medium being registered remotely, such as over the Internet or other such network. After the digital storage medium is registered with portal 120, portal 120 informs network personal video recorder 100 that the user wishes to store video programs using the registered digital storage medium (depicted in FIG. 1 as user data storage 155) as well as provides the authentication credentials to access user data storage 155.

Embodiments may register digital storage mediums of a user in a variety of different fashions; as an example, in an embodiment a user may register a digital storage medium and submit authentication credentials for the digital storage medium directly to network personal video recorder 100 via a web site associated with the digital content provider operating network personal video recorder 100.

In this context, an authentication credential may correspond to any type of data which may be supplied by a user and which may be used by network personal video recorder 100 to gain access to a particular digital storage medium of the user. Non-limiting, illustrative examples of authentication credentials include a username/password combination, a shared secret, and the like. For example, if the user is registering an account the user has with a cloud-based storage provider, then the user must provide, in the act of registering that account, any authentication credentials necessary for network personal video recorder 100 to read and write data to that account.

Certain vendors of digital storage mediums and/or cloud-based storage providers expose an application program interface (API) to permit access over a network. In such a case, the authentication credentials collected from the user during the registration process would include any information required by the API to obtain read and write access to the digital storage using the API.

Recording a Video Program onto a Registered Storage Medium of the User

Once to user has registered user data storage 155 with network personal video recorder 100, the user may request that a particular video program be recorded and, as a consequence, the particular video program will be stored on user data storage 155. For example, a user of network personal video recorder 100 can access portal 120 over the Internet using their user device 110. The user can access program listings by communicating with portal 120 and request the recording of a particular video program.

In step 220, network personal video recorder 100 receives an instruction from the user to record a particular video program. If the user accesses portal 120 to request that a particular video program be recorded, then portal 120 would send the user's request to CMS 130 of network personal video recorder 100. CMS 130 determines whether the user has permission to record the requested video program. If the user lacks sufficient permission to record the video program (for example, the user might not be entitled to a video program he or she has not paid for), then the user is informed that the user does not have sufficient permission to access or record the video program. The user may be provided an option to gain access to the video program (for example, by submitting authorization via user device 110 to pay for the video program) so that it may be recorded. However, if the user lacks sufficient permission to record the request video program, the requested video program is not recorded.

If the user does have the permission to record the request video program, then CMS 130 sends the user's request to video server 150. Video server 150, in turn, records the requested video program by storing a copy of the requested video program in data store 155 using the authentication credentials provided by the user.

Network personal digital recorder 100 may provide information to user device 110 that user device displays to the user. Video server 150, or a component in communication therewith, may monitor network conditions between network personal video recorder 100 and user data storage 155. In this way, network personal digital recorder 100 may provide to user device 110, to be displayed thereon to the user, an estimate, based on current network conditions between network personal video recorder 100 and user data storage 155, on when the requested video program will be stored and/or available on user data storage 155.

If, in step 220, network personal video recorder 100 is unable, for whatever reason, to successfully store a copy of the requested video program in user data storage 155, then network personal video recorder 100 may store a copy of the requested video program in a secondary location, such as a second user data storage 155 registered by the user, at a digital storage device located at network personal video recorder 100, or at a cloud-based digital storage account associated with the content provider.

Playing a Video Program from a Registered Storage Medium of the User

After network personal video recorder 100 has stored a copy of a video program in user data storage 155, the user may wish to view the recorded video program. In step 230, the user may issue a command to network personal video recorder 100 to play the recorded video program on a particular user device 110. Once network personal video recorder 230 receives the command to play the recorded video program, stored on user data storage 155, on a particular video device 110, network personal video recorder 230 may stream the video program to user device 110 to allow user device 110 to play the stream video program.

In an embodiment, the copy of video program is stored on user data storage 155 in a proprietary or known encrypted format. In such an embodiment, the digital content provider operating network personal digital recorder 100 may provide to a user a secure video player that is configured to decrypt and play digital content that is encrypted in the proprietary or known encrypted format.

The digital content provider may not wish to store certain content in a restrictive fashion and may wish stored digital content to be usable by a variety of video players from various vendors and/or providers. Thus, in another embodiment, certain video programs may be stored on user data storage 155 in a non-proprietary format (thereby allowing many different types of video players to play the video program directly from user data storage 155) if the digital content provider has deemed the video program to be unrestricted content.

Advantageously, embodiments of the invention allow network personal video recorder 100 to scale to support any number of users. The manner in which network personal video recorder 100 stores video programs is in full compliance with copyright law, as each user has a separate and dedicated stored copy of any video program they wish to record.

Hardware Mechanisms

Figure 3:
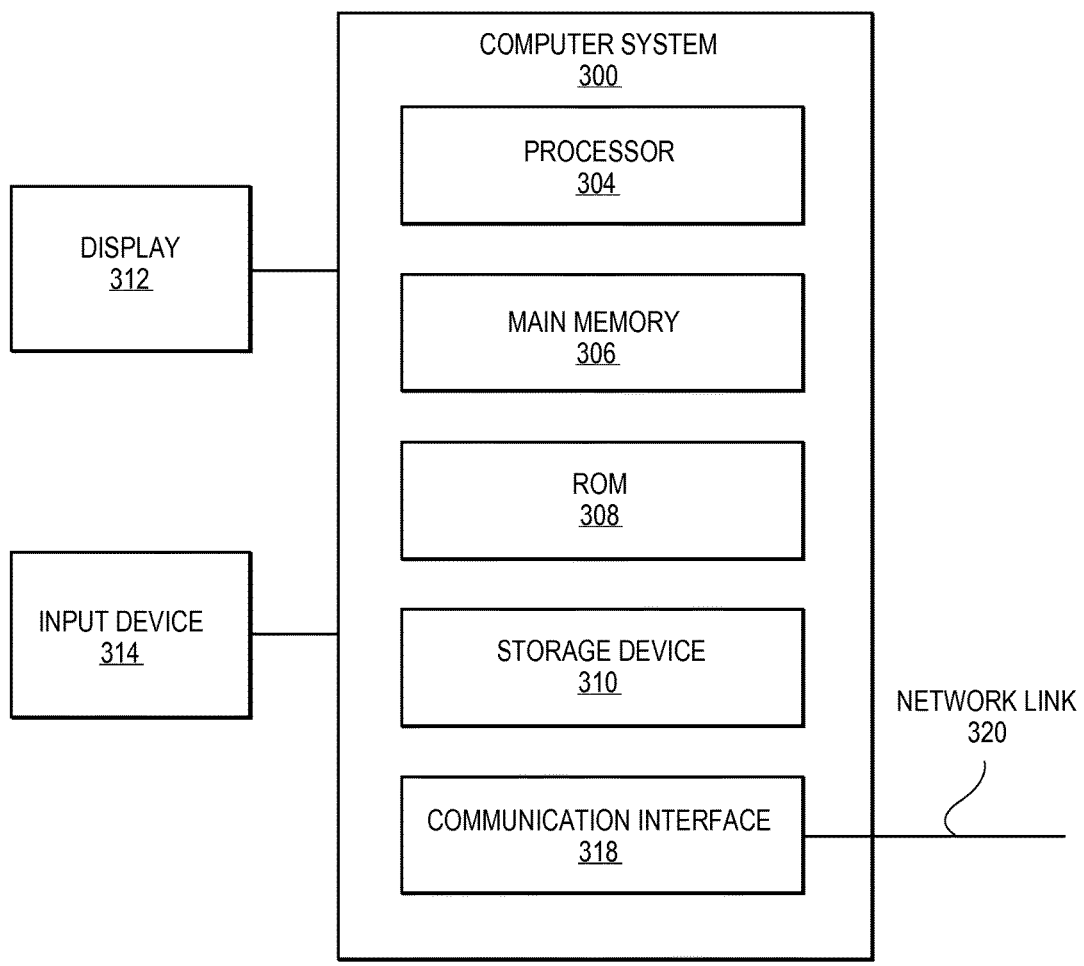
FIG. 3 is a block diagram that illustrates a computer system upon which an embodiment of the invention may be implemented.

In an embodiment, one or more of user device 110, portal 120, the content management system (CMS) 130, content delivery network 140, video server 150, user data storage 155, packager 160, and DRM module 170 depicted in FIG. 1 may be implemented by one or more computer systems. FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for operating a network personal video recorder, which when executed by one or more processors, causes:
   at the network personal video recorder located at a head-end of a content provider, receiving, from a user, authentication credentials that provide access, via the Internet, to a network-based digital storage account belonging to or associated with the user, wherein said network personal video recorder is a network-based digital video recorder which is operated by the content provider and not said user,
wherein the network-based digital storage account permits storage of digital data belonging to said user on a physical device that is in the custody of a cloud-based storage provider and is not in the custody of said user or said content provider;
in response to said network personal video recorder receiving, from the user, a first instruction to record a video program, said network personal video recorder (a) attempting to cause a copy of said video program to be stored in said network-based digital storage account in a proprietary or known encrypted format using said authentication credentials, and (b) only if the copy of said video program could not be stored in said network-based digital storage account, said network personal video recorder causing said copy of said video program to be stored in a secondary location; and
in response to said network personal video recorder receiving a second instruction, from the user, to view said video program, said network personal video recorder (a) reading said copy of said video program from said network-based digital storage account or said secondary location, and (b) causing said video program read from said network-based digital storage account or said secondary location to be played on a device associated with said user, wherein causing said video program to be played includes providing to said user a secure video player which is configured to decrypt and play digital content that is encrypted in said proprietary or known encrypted format.

2. The non-transitory computer-readable storage medium of claim 1, wherein execution of the one or more sequences of instructions further causes:
in response to said network personal video recorder receiving, from said user, said first instruction to record the video program, said network personal video recorder providing to the user an estimate, based on current network conditions between said network personal video recorder and said cloud-based storage provider, on when said video program will be stored and available in said network-based digital storage account.

3. The non-transitory computer-readable storage medium of claim 1, wherein said authentication credentials are submitted to said network personal video recorder via a web site associated with the content provider.

4. The non-transitory computer-readable storage medium of claim 1, wherein execution of the one or more sequences of instructions further causes:
in response to said network personal video recorder determining that said video program has been deemed to be unrestricted content, said network personal video recorder storing said video program in said network-based digital storage account in a non-proprietary format.

5. An apparatus for operating a network personal video recorder, comprising:
one or more processors; and
one or more non-transitory computer-readable storage mediums storing one or more sequences of instructions, which when executed by the one or more processors, causes:
at the network personal video recorder located at a head-end of a content provider, receiving, from a user, authentication credentials that provide access, via the Internet, to a network-based digital storage account belonging to or associated with the user, wherein said network personal video recorder is a network-based digital video recorder which is operated by the content provider and not said user;
wherein the network-based digital storage account permits storage of digital data belonging to said user on a physical device that is in the custody of a cloud-based storage provider and is not in the custody of said user or said content provider;
in response to said network personal video recorder receiving, from the user, a first instruction to record a video program, said network personal video recorder (a) attempting to cause a copy of said video program to be stored in said network-based digital storage account in a proprietary or known encrypted format using said authentication credentials, and (b) only if the copy of said video program could not be stored in said network-based digital storage account, said network personal video recorder causing said copy of said video program to be stored in a secondary location; and
in response to said network personal video recorder receiving a second instruction, from the user, to view said video program, said network personal video recorder (a) reading said copy of said video program from said network-based digital storage account or said secondary location, and (b) causing said video program read from said network-based digital storage account or said secondary location to be played on a device associated with said user, wherein causing said video program to be played includes providing to said user a secure video player which is configured to decrypt and play digital content that is encrypted in said proprietary or known encrypted format.

6. The apparatus of claim 5, wherein execution of the one or more sequences of instructions further causes:
in response to said network personal video recorder receiving, from said user, said first instruction to record the video program, said network personal video recorder providing to the user an estimate, based on current network conditions between said network personal video recorder and said cloud-based storage provider, on when said video program will be stored and available in said network-based digital storage account.

7. The apparatus of claim 5, wherein said authentication credentials are submitted to said network personal video recorder via a web site associated with the content provider.

8. The apparatus of claim 5, wherein execution of the one or more sequences of instructions further causes:
in response to said network personal video recorder determining that said video program has been deemed to be unrestricted content, said network personal video recorder storing said video program in said network-based digital storage account in a non-proprietary format.

9. A method of operating a network personal video recorder, comprising:
at the network personal video recorder located at a head-end of a content provider, receiving, from a user, authentication credentials that provide access, via the Internet, to a network-based digital storage account belonging to or associated with the user, wherein said network personal video recorder is a network-based digital video recorder which is operated by the content provider and not said user, wherein the network-based digital storage account permits storage of digital data belonging to said user on a physical device that is in the custody of a cloud-based storage provider and is not in the custody of said user or said content provider;

in response to said network personal video recorder receiving, from the user, a first instruction to record a video program, said network personal video recorder (a) attempting to cause a copy of said video program to be stored in said network-based digital storage account in a proprietary or known encrypted format using said authentication credentials, and (b) only if the copy of said video program could not be stored in said network-based digital storage account, said network personal video recorder causing said copy of said video program to be stored in a secondary location; and in response to said network personal video recorder receiving a second instruction, from the user, to view said video program, said network personal video recorder (a) reading said copy of said video program from said network-based digital storage account or said secondary location, and (b) causing said video program read from said network-based digital storage account or said secondary location to be played on a device associated with said user, wherein causing said video program to be played includes providing to said user a secure video player which is configured to decrypt and play digital content that is encrypted in said proprietary or known encrypted format.

10. The method of claim 9, further comprising:

in response to said network personal video recorder receiving, from said user, said first instruction to record the video program, said network personal video recorder providing to the user an estimate, based on current network conditions between said network personal video recorder and said cloud-based storage provider, on when said video program will be stored and available in said network-based digital storage account.

11. The method of claim 9, wherein said authentication credentials are submitted to said network personal video recorder via a web site associated with the content provider.

12. The method of claim 9, further comprising:

in response to said network personal video recorder determining that said video program has been deemed to be unrestricted content, said network personal video recorder storing said video program in said network-based digital storage account in a non-proprietary format.

* * * * *